(12) United States Patent
Jang

(10) Patent No.: US 7,558,084 B2
(45) Date of Patent: Jul. 7, 2009

(54) SWITCHING MODE POWER SUPPLY WITH COMPENSATED PROPAGATION DELAY

(75) Inventor: Kyung Oun Jang, Incheon (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 0 days.

(21) Appl. No.: 11/586,992

(22) Filed: Oct. 25, 2006

(65) Prior Publication Data

US 2007/0091651 A1    Apr. 26, 2007

(30) Foreign Application Priority Data

Oct. 25, 2005    (KR)  .................... 10-2005-0100558

(51) Int. Cl.
H02M 3/335    (2006.01)
H02H 7/122    (2006.01)
H02M 3/24    (2006.01)

(52) U.S. Cl. ................. 363/21.12; 363/56.1; 363/97
(58) Field of Classification Search ........... 363/21.12, 363/21.13, 21.15, 21.16, 21.17, 56.01, 56.09, 363/56.1, 97
See application file for complete search history.

(56) References Cited

U.S. PATENT DOCUMENTS

| 6,252,783 | B1* | 6/2001 | Huh et al. ............... 363/21.01 |
| 6,292,376 | B1* | 9/2001 | Kato .................. 363/21.09 |
| 6,646,894 | B2* | 11/2003 | Hong et al. ............. 363/21.01 |
| 6,781,357 | B2* | 8/2004 | Balakrishnan et al. ...... 323/282 |
| 7,064,968 | B2* | 6/2006 | Choi et al. ................. 363/97 |
| 7,218,532 | B2* | 5/2007 | Choi et al. ............. 363/21.01 |
| 7,233,504 | B2* | 6/2007 | Djenguerian et al. ..... 363/21.13 |

* cited by examiner

Primary Examiner—Bao Q Vu
(74) Attorney, Agent, or Firm—Sidley Austin LLP

(57) ABSTRACT

A switching mode power supply includes a power supply, a feedback circuit, and a switching controller. The power supply includes a main switch coupled to a primary coil of a transformer and supplies power to a secondary coil of the transformer according to an operation of the main switch. The feedback circuit generates a feedback voltage corresponding to an output voltage applied to the secondary coil. The switching controller compensates a propagation delay by controlling a duty of the main switch according to a result of comparing a first signal that fluctuates according to a first voltage corresponding with a current flowing through the main switch to a reference voltage corresponding to the feedback voltage.

22 Claims, 10 Drawing Sheets

SWITCHING MODE POWER SUPPLY WITH COMPENSATED PROPAGATION DELAY

CROSS-REFERENCE TO RELATED APPLICATION

This application claims priority to and the benefit of Korea Patent Application No. 10-2005-0100558 filed on Oct. 25, 2005 in the Korean Intellectual Property Office, the entire content of which is incorporated herein by reference.

BACKGROUND (a) Field of the Invention

The present invention relates generally to a switching mode power supply (SMPS). More particularly, the present invention relates to an SMPS for providing an essentially fixed maximum output power.

(b) Description of the Related Art

In general, an SMPS is a device for converting a DC supply voltage into at least one DC output voltage using switching processing of a semiconductor device. The SMPS may be used as a power supply for batteries installed in mobile telephones and laptop computers.

A problem in the conventional SMPS is that the maximum output power may not be maintained when the input voltage changes, due to a propagation delay time of many devices that are present in an SMPS. Examples include a propagation delay time of a controller of the SMPS, the turn-off delay time of a switch, feedback delay, etc.

SUMMARY

Briefly and generally, embodiments of the present invention provide a switching mode power supply that supplies an essentially fixed maximum output power independent of a level of an input voltage. The switching mode power supply compensates for a voltage drop according to temperature increments, and supplies the fixed maximum output power.

In one aspect of the present invention, a switching mode power supply (SMPS) includes: a power supply including a main switch coupled to a primary coil of a transformer, and supplying power to a secondary coil of the transformer according to an operation of the main switch; a feedback circuit that generates a feedback voltage corresponding to an output voltage applied to a secondary coil thereof; and a switching controller that compensates a propagation delay by controlling a duty of the main switch according to a result of comparison of a first signal that fluctuates according to a first voltage corresponding to a current flowing through the main switch with a reference voltage corresponding the feedback voltage.

The main switch is turned off with a time compensation corresponding to the propagation delay, according to a result of comparing the first signal with the reference voltage. The switching controller generates the first signal using the first voltage and a second signal corresponding to a saw-tooth signal. The first voltage is generated from the current flowing through the main switch when it is turned on to a resistor that is serially connected between the main switch and ground. The switching controller includes a transistor that turns on corresponding to the saw-tooth signal, and generates the first signal using the saw-tooth signal delivered through the turned-on transistor and the first voltage. The main switch is turned on at the falling-edge of a clock signal and is turned off when the first signal is greater than the reference voltage. A first period when the saw-tooth signal is falling to the low level from the high level includes a second period and a third period, and a first incline of the second signal corresponding to the second period is different from a second incline of the second signal corresponding to the third period. The first incline is greater than the second incline. The period of the clock is the same as that of the saw-tooth signal.

In another aspect of the present invention, a switching controller for controlling a duty of a main switch of a switching mode power supply (SMPS) including the main switch coupled to a primary coil of a transformer includes: a gate driver, an output terminal of which is connected to a control electrode of the main switch; a first logic operation unit, an output terminal of which is connected to an input terminal of the gate driver, and that is delivered a first clock signal through an input terminal of a plurality of input terminals thereof; a second logic operation unit, an output terminal of which is connected to another input terminal of the first logic operation unit, and that is delivered a first signal through an input terminal of a plurality of input terminals thereof; a third logic operation unit, an output terminal of which is connected to another input terminal of the second logic operation unit; a comparator, an output terminal of which is connected to an input terminal of the third logic operation unit, and that is delivered a first voltage through a non-inverting terminal; and a compensating delay unit that generates a second signal using a third signal and a second voltage corresponding to a current flowing through the main switch and that delivers the second signal to an inverting terminal of the comparator.

The compensation delay unit includes: a first resistor, a first terminal of which delivers the second voltage, and a second terminal of which is coupled to the non-inverting terminal; a second resistor, a first terminal of which is coupled to the second terminal of the first resistor; a third resistor, a first terminal of which is coupled to the second terminal of the second resistor; and a switching element, a first electrode of which is coupled to the second terminal of the third resistor and a second electrode of which is coupled the second terminal of the second resistor, and that operating in correspondence with the third signal.

The compensation delay unit further includes a fourth resistor, a first terminal of which is coupled to the first electrode of the switching element, the third signal being delivered to the first terminal, and a second terminal of which is coupled to a control electrode of the switching element; and a fifth resistor, a first terminal of which is coupled to a control electrode of the switching element. The third signal has a saw-tooth waveform, and the switching element is an n-type channel transistor. The compensation delay unit further includes a sixth resistor, a first terminal of which is coupled to the second electrode of the switching element, and a second terminal of which is coupled to the second terminal of the second resistor. The sixth resistor has a resistance value for compensating for a threshold voltage drop of the n-type channel transistor according to a temperature increase. The first voltage corresponds to a feedback voltage that corresponds to an output voltage provided to a secondary coil of the transformer. The third logic operation unit is a NOR gate, and an input terminal thereof is connected to a leading edge blanking circuit. The second logic operation unit is an SR flip-flop, the first signal thereof is a clock signal that is delivered to a set terminal of the SR flip-flop, and a reset terminal thereof is connected to the output terminal of the third logic operation unit. The first logic operation unit is a NOR gate, and an input terminal thereof is coupled to an inverting output terminal of the SR flip-flop.

DETAILED DESCRIPTION

Figure 1:
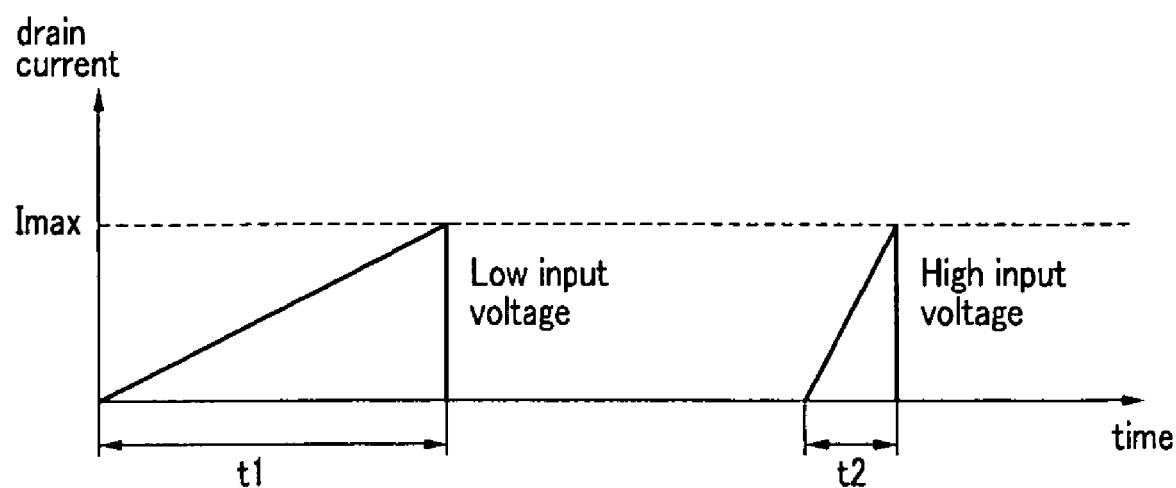
FIG. 1 illustrates a current in the main switch of the SMPS when a propagation delay time is absent.

In the following detailed description, only certain embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 is a drawing showing a drain current Idrain in a main switch, connected to the primary side of a typical SMPS without a propagation delay time. In the absence of a propagation delay time, the maximum current Imax in the main switch remains constant in spite of variations of the input voltage Vin. Correspondingly, the maximum power delivered to the output terminal of the SMPS is constant. In one implementation, a relationship similar to equation 1 holds between the drain current Idrain, the input voltage Vin, and the inductance value Lm of a coil in the primary side of SMPS:

$$\frac{d\,Idrain}{dt} = \frac{Vin}{Lm} \qquad \text{[Equation 1]}$$

Figure 2:
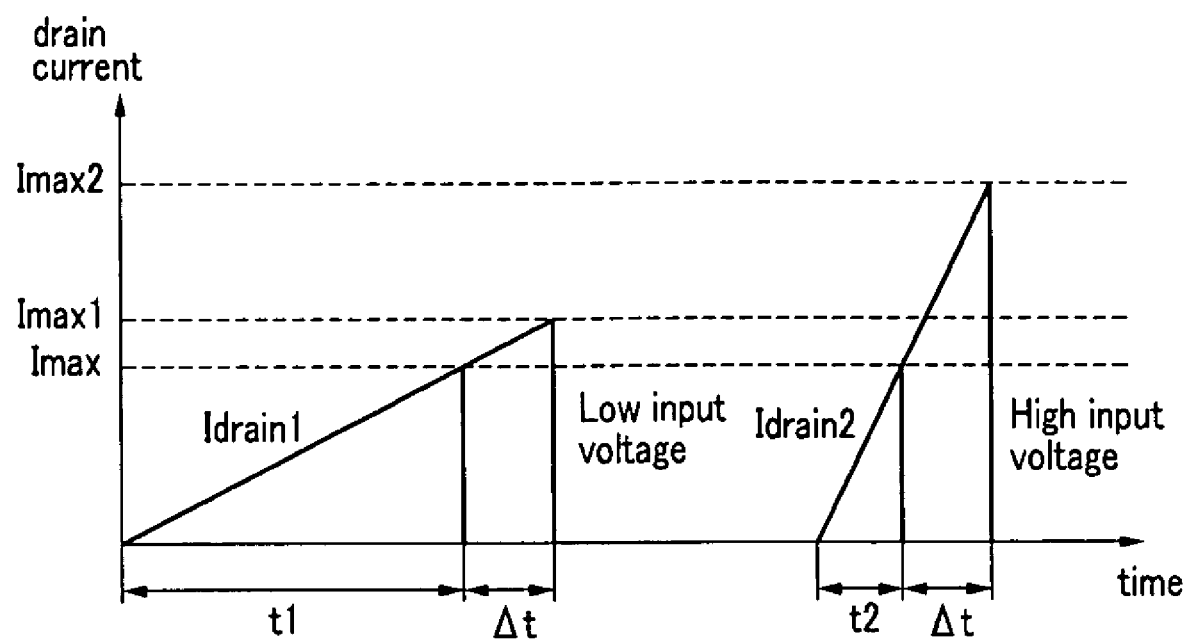
FIG. 2 illustrates the current in the main switch of the SMPS in the presence of a propagation delay time.

FIG. 2 is a drawing showing drain currents in a main switch, connected to the primary side of an SMPS with a propagation delay. In the case of a propagation delay time $\Delta t$ the maximum current in the main switch varies according to the input voltage Vin. For Vin=V1, a first drain current Idrain1 reaches Imax in a time t1, and for Vin=V2, a second drain current Idrain2 reaches Imax in a time t2, in analogy to FIG. 1. However, because of the presence of a delay time $\Delta t$, the maximum value of the first current Idrain1 becomes Imax1, and the maximum value of the second current Idrain2 becomes Imax2. Thus, Imax1 and Imax2 will exceed Imax, and will be different from each other. This latter is due to the fact that different input voltages give rise to different slopes of the current in the main switch. The slope of the current increases if the input voltage increases. The difference and variation of the maximum current in the main switch can cause serious problems, affecting the maximum output power of the SMPS.

Figure 3:
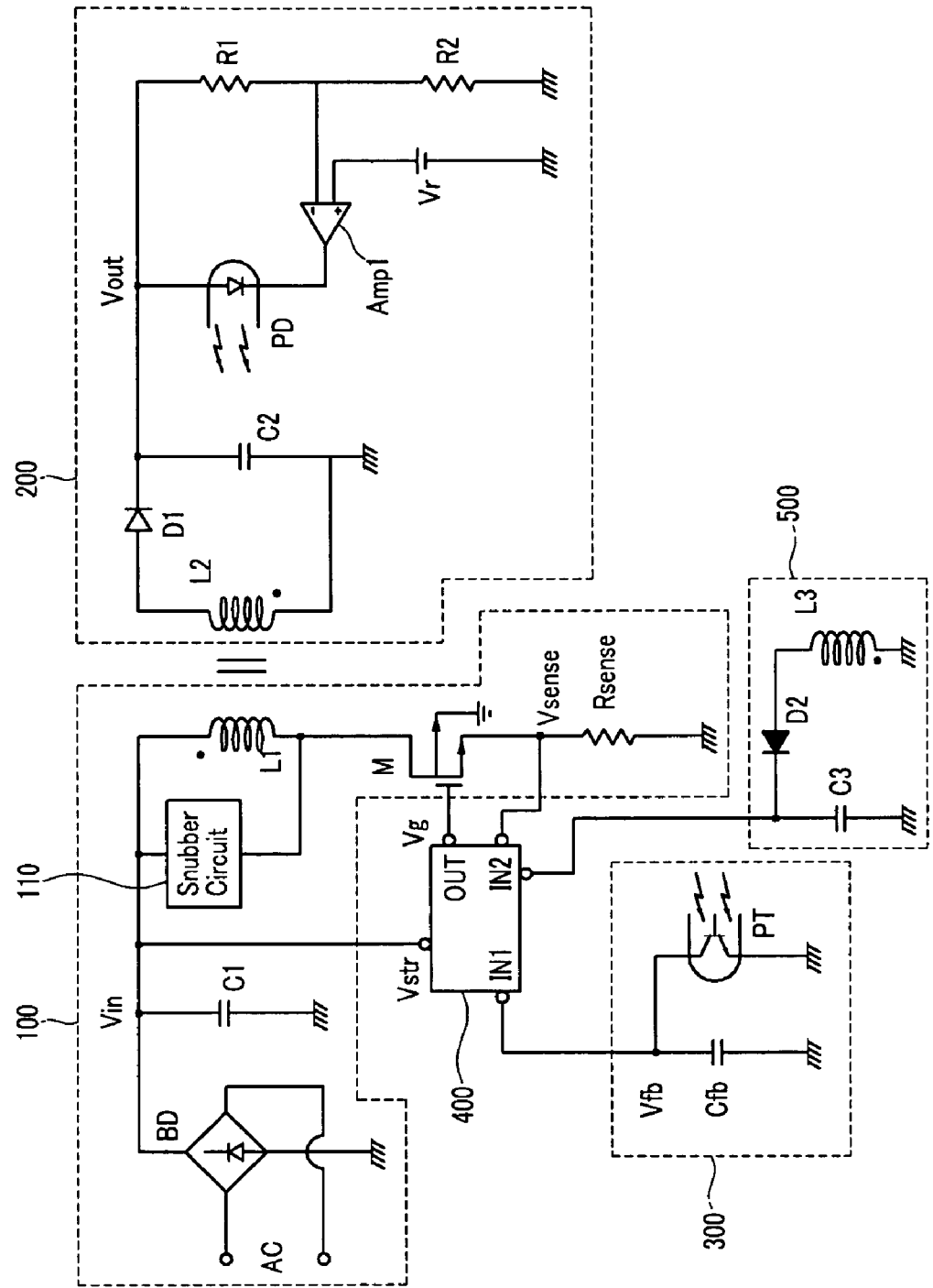
FIG. 3 illustrates a schematic diagram of an SMPS.

FIG. 3 illustrates a circuit diagram of the SMPS according to an embodiment of the present invention. An SMPS may include a power supply 100, an output unit 200, a feedback circuit 300, a switching controller 400, and a bias voltage supply unit 500.

The power supply 100 may include a bridge diode BD for rectifying an alternating current (AC) input voltage, a capacitor C1 for smoothing the rectified voltage Vin, a primary coil L1 of a transformer coupled to an input voltage Vin, a switching MOS transistor M coupled to the primary coil L1, a sense resistor Rsense coupled between a source of the transistor M and a ground, and a snubber circuit 110 connected to both ends of the coil L1. The main switch is shown to be a MOSFET, but other switching elements that perform the same operation can be used. The gate electrode, drain electrode, and source electrode of the switching MOS transistor M can be referred to as the control electrode, a first electrode, and a second electrode of the main switch.

The power supply 100 supplies power to the secondary side of a transformer according to the duty of the switching MOS transistor M. An output voltage Vout is outputted by an output unit 200. The SMPS controls the duty of the switching MOS transistor M by using a feedback voltage related to the output voltage Vout, this way regulating the output voltage Vout. A snubber circuit 110 controls a sudden rise of the input voltage Vin and prevents the switching MOS transistor M from getting damaged.

The output unit 200 may include a first diode D1 having an anode coupled to the secondary coil L2 of the transformer, a capacitor C2 coupled between a cathode of the first diode D1 and the ground, a first resistor R1 and a second resistor R2 coupled in series between the cathode of the first diode D1 and the ground, an error amplifier Amp1 having an inverting terminal (−) coupled to a node between the first resistor R1 and the second resistor R2, a non-inverting terminal (+) coupled to a first reference voltage Vr, and a photodiode PD coupled to an output terminal of the error amplifier Amp1.

The output unit 200 supplies the output voltage Vout to a load. The output unit 200 also provides information regarding the output voltage Vout to a feedback circuit 300 to regulate the output voltage Vout. For example, a partial voltage Vp having a magnitude of (Vout*R2/(R1+R2)) can be applied to the inverting terminal of the error amplifier Amp1, and a first reference voltage Vr can be applied to the non-inverting terminal of the error amplifier Amp1.

The error amplifier Amp1 compares the partial voltage Vp to the first reference voltage Vr. According to the result of this comparison, a current in the photodiode PD is determined. When the output voltage Vout is high the current in the photodiode is high. The photodiode PD and a photo transistor PT of the feedback circuit 300 form a photocoupler or optocoupler to provide information regarding the output voltage Vout to the feedback circuit 300.

The feedback circuit 300 may include the phototransistor PT and a capacitor Cfb coupled in parallel to the phototransistor PT. A current in the phototransistor PT is determined according to the current in the photodiode PD. If the current in the phototransistor PT increases, a feedback voltage Vfb stored in the capacitor Cfb is reduced. Conversely, if the current in the phototransistor PT decreases, the feedback voltage Vfb in the capacitor Cfb is increased. Through this feedback coupling the feedback voltage Vfb is high if the output voltage Vout of the output unit 200 is low, e.g. during an initial startup of the SMPS.

Information, corresponding to the output voltage Vout, is generated by the feedback circuit 300, and is applied to the switching controller 400. This information is used to control the duty cycle of the MOS transistor M.

The bias voltage supply unit 500 includes a capacitor C3, a coil L3, and a diode D2. A terminal of the capacitor C3 is grounded, and the other terminal is connected to the switching controller 400 and a cathode of the diode D2. A terminal of the coil L3 is grounded, and the other end is connected to the anode of the diode D2. A voltage V3 is transferred to the capacitor C3 while the switching transistor M is turned off. This voltage is not transferred to the capacitor C3 while the switching MOS transistor M is turned on. If a voltage Vc of the capacitor C3 reaches a supply voltage Vcc, operating the switching controller 400, the switching controller 400 starts driving.

Figure 4:
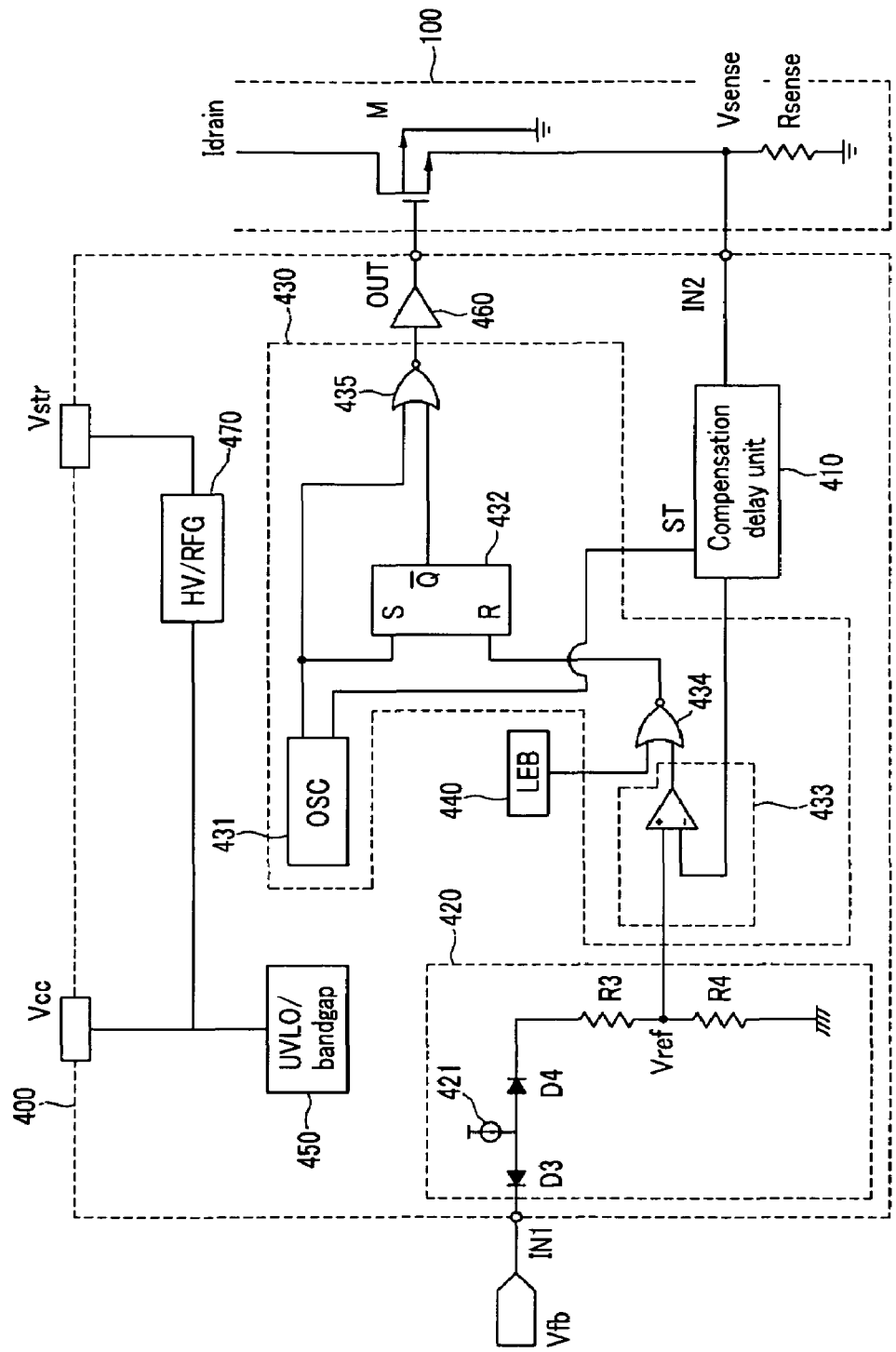
FIG. 4 illustrates a circuit diagram of a switching controller of the SMPS.

FIG. 4 illustrates a circuit diagram of the switching controller 400. The switching controller 400 may include a compensation delay unit 410, a feedback information generator 420, a PWM (pulse width modulation) controller 430, an LEB (leading edge blanking) unit 440, a UVLO (undervoltage lockout)/BG (bandgap) unit 450, a gate driver 460, and an HV/REG (high voltage/regulator) 470.

The PWM controller 430 includes an oscillator (OSC) 431, a PWM flip-flop 432, a PWM comparator 433, a first NOR gate 434, and a second NOR gate 435.

The feedback information generator 420 includes a third diode D3, a fourth diode D4, a third resistor R3, a fourth resistor R4, and a current source 421.

The UVLO/BG unit 450 provides an essentially constant voltage in the switching controller 400 using the voltage Vcc delivered from the capacitor C3. The HV/REG 470 controls the voltage Vcc to fall essentially within a fixed range.

The compensation delay unit 410 may receive the sensed voltage Vsense through the input terminal IN2 and the saw-tooth signal ST from the OSC 431. The compensation delay unit 410 produces an offset voltage Voff using the sensed voltage Vsense and the saw-tooth signal ST. The compensation delay unit 410 outputs the offset voltage Voff to the inverting input terminal (−) of the comparator 433.

PWM flip-flop 432 is connected to the first NOR gate 434, the second NOR gate 435, and the OSC 431. A set terminal S of the PWM flip-flop 432 is connected to the OSC 431 and a reset terminal R is connected to the NOR gate 434. The PWM flip-flop 432 outputs an inverted output signal according to the signals that are inputted to the reset terminal R and the set terminal S.

The OSC 431 produces a clock signal CLK and the saw-tooth signal ST. The clock signal CLK is delivered to the NOR gate 435 and the PWM flip-flop 432. In some embodiments the clock signal CLK and the saw-tooth signal ST have essentially the same period.

The LEB unit 440 is connected to a first input terminal of the NOR gate 434. The LEB unit 440 prevents the switching MOS transistor M from being turned off by the peak current of the switching MOS transistor M when the switching MOS transistor M is turned on. When the switching MOS transistor M is turned on, a signal from the LEB unit 440 has a high level. This signal is low otherwise.

The comparator 433 includes a non-inverting input terminal (+) and an inverting input terminal (−). The non-inverting input terminal (+) is connected to a node between the resistor R3 and the resistor R4. The inverting input terminal (−) is connected to the output terminal of the compensation delay unit 410.

A reference voltage Vref is generated by using the feedback voltage Vfb, the resistor R3 and the resistor R4. The feedback voltage Vfb is scaled down by the resistors R3 and R4 into the reference voltage Vref. The reference voltage Vref is input to the non-inverting input terminal (+) of the comparator 433.

A first input terminal and a second input terminal of the NOR gate 434 are respectively connected to the LEB unit 440 and the comparator 433. The NOR gate 434 outputs a signal according to the logical NOR operation using input signals from the LEB unit 440 and the comparator 433, to the reset terminal R of the PWM flip-flop 432.

The clock signal CLK of the OSC 431 and the inverted output signal of PWM flip-flop 432 are respectively input to a first input terminal and a second input terminal of the NOR gate 435. The NOR gate 435 outputs a signal according to the logical NOR operation using the clock signal CLK of the OSC 431 and the inverted output signal of the PWM flip-flop 432 to the gate driver 460.

According to the signal level outputted from the NOR gate 435, the gate driver 460 controls the on/off of the switching MOS transistor M. That is, the gate driver 460 turns on the switching MOS transistor M when the signal outputted from the NOR gate 435 is high, and the gate driver 460 turns off the switching MOS transistor M when the signal outputted from the NOR gate 435 is low.

Figure 5:
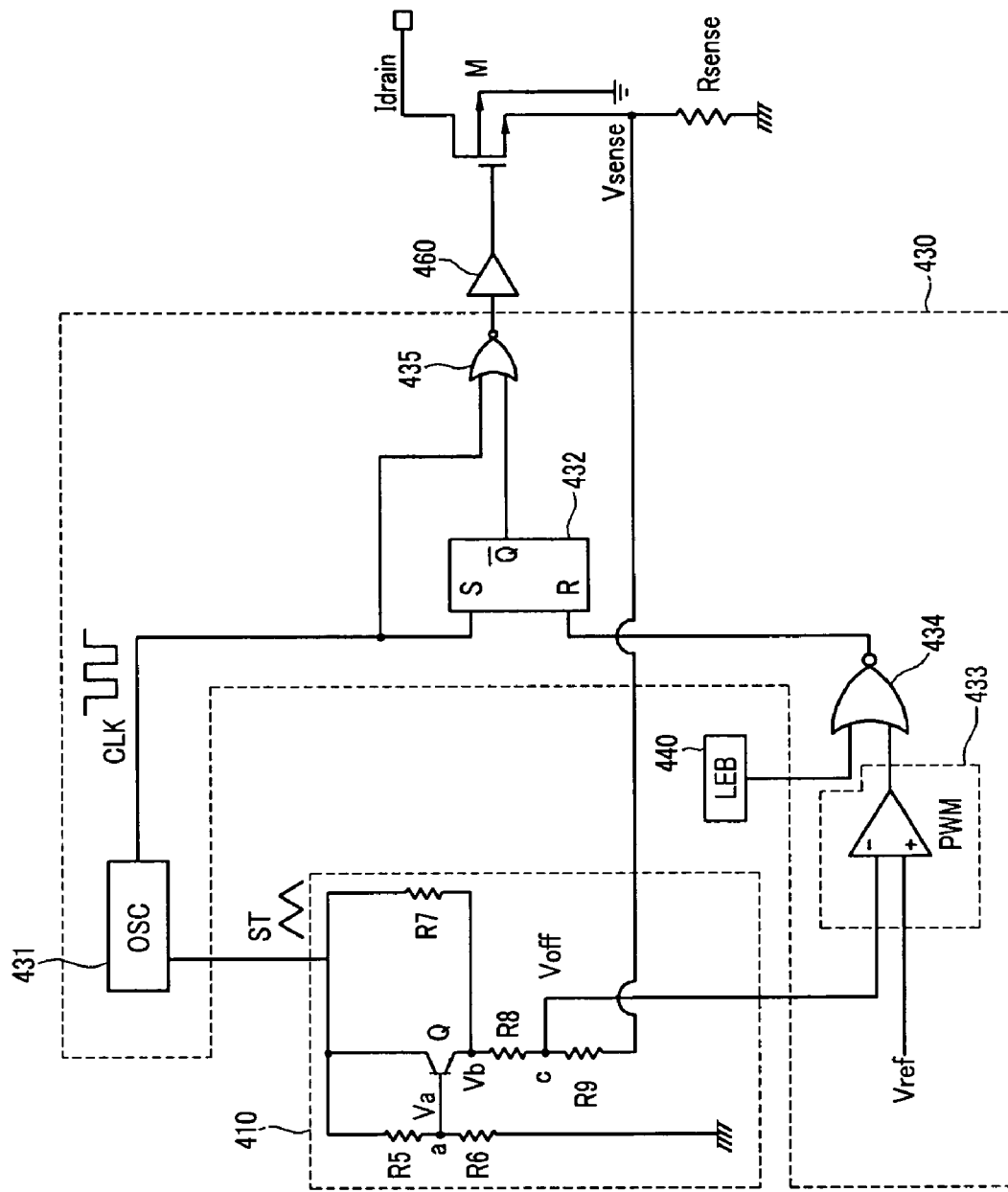
FIG. 5 illustrates a circuit diagram of a propagation delay compensator of the SMPS.

FIG. 5 illustrates a circuit diagram of the compensation delay unit 410. The compensation delay unit 410 may include a switching element Q and resistors R5-R9. The switching element Q can be an n-channel BJT (bipolar junction transistor), but other switching elements that perform the equivalent operation can alternatively be used.

A collector of the switching element Q may be connected to the oscillator (OSC) 431, and the terminals of the resistor R5 can respectively be connected to a base and the collector of the switching element Q. A terminal of the resistor R6 can be connected to the base of the switching element Q, and the other terminal of the resistor R6 is grounded. The voltage Va of the node (a) at which the resistor R5 is connected with the resistor R6 can be applied to the base of the switching element Q.

The terminals of the resistor R7 can respectively be connected to the collector and an emitter of the switching element Q. A terminal of the resistor R8 can be connected to the emitter of the switching element Q and the other terminal of the resistor R8 can be connected to a terminal of the resistor R9. The other terminal of the resistor R9 can be connected to the source electrode of the switching MOS transistor M to receive the sensed voltage Vsense.

A node (c) at which the resistor R8 is connected to the resistor R9 can be connected to the inverting input terminal (−) of the comparator 433. Here, the voltage of the node (c) plays the role of an offset voltage Voff. This voltage of the node (c) is determined by an emitter voltage Vb, the sensed voltage Vsense, and the resistance ratio of the resistor R8 and the resistor R9. The offset voltage Voff can be applied to the inverting input terminal (−) of the comparator 433.

Next, the method of operating of SMPS is illustrated with reference to FIGS. 6, 7, and 8.

Figure 6:
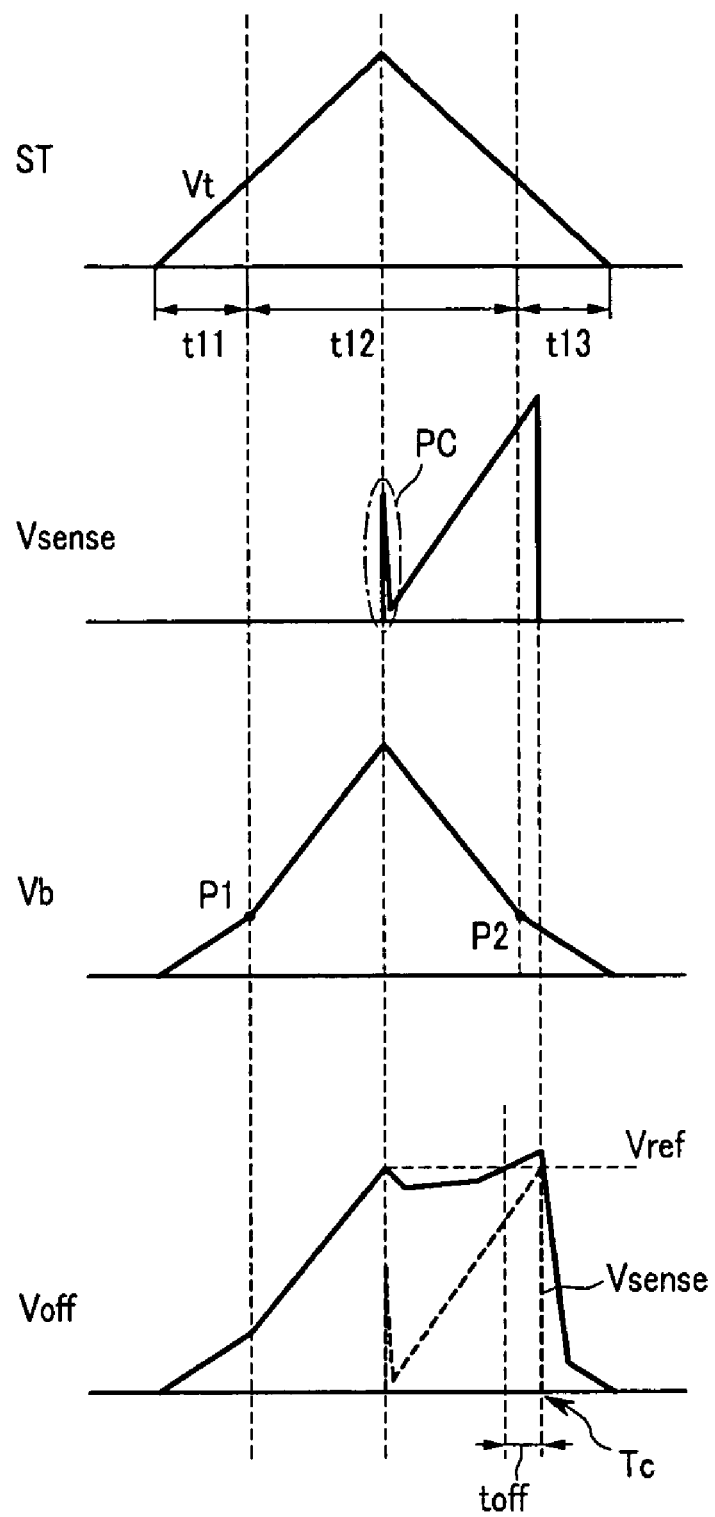
FIG. 6 illustrates a waveform of a voltage signal in the propagation delay compensator of the SMPS.

FIG. 6 illustrates waveforms of the offset voltage Voff, the sensed voltage Vsense, the emitter voltage Vb of the switching element Q, and the saw-tooth signal ST.

The saw-tooth signal ST can have the same period as the clock signal CLK. The sensed voltage Vsense is a voltage that can be generated while the drain current Idrain flows in the resistor Rsense. A peak current PC in the waveform of the sensed voltage Vsense shows the surge current when the switching MOS transistor M is turned on.

The slope of the emitter voltage Vb can be different according to the on/off state of the switching element Q. The difference between the voltage of the sensed voltage Vsense and the emitter voltage Vb can be related to a ratio of the resistors R8 and R9. The compensation delay unit 410 may produce the offset voltage Voff by using the emitter voltage Vb according to a voltage Vt level of the saw-tooth signal ST and the sensed voltage Vsense.

The on/off state of the switching element Q can be controlled with the voltage Va at the node (a). The voltage Vt of the saw-tooth signal ST is scaled according to the resistance ratio of the resistors R5 and R6. The voltage Va at the node (a) can be as given in Equation 2:

$$Va = \left(\frac{R6}{R5+R6}\right)Vt \quad \text{[Equation 2]}$$

During the intervals t11 and t13 the voltage Va at the node (a) is smaller than the threshold voltage of the switching element Q, thus the switching element Q is turned off. At this time, the voltage difference between the voltage Vt of the saw-tooth signal ST and the sensed voltage Vsense is coupled into the resistors R7-R9. The emitter voltage Vb is given by Equation 3, and the voltage Voff is given by Equation 4. In the interval t11 no sensed voltage Vsense is generated, so the second terms on the right hand side in Equation 3 and Equation 4 are zero. Therefore, in the interval t11 the waveform of the offset voltage Voff is similar to the shape of the saw-tooth signal ST.

$$Vb = \left(\frac{R8+R9}{R7+R8+R9}\right)Vt + \left(\frac{R7}{R7+R8+R9}\right)Vsense \quad \text{[Equation 3]}$$

$$Voff = \left(\frac{R9}{R7+R8+R9}\right)Vt + \left(\frac{R7+R8}{R7+R8+R9}\right)Vsense \quad \text{[Equation 4]}$$

In the interval t12 in which the voltage Va of the node (a) is greater than the threshold voltage of the switching element Q, the switching element Q is turned on. Here, the resistance of the turned-on switching element Q is very small in comparison with that of the resistor R7. Therefore, the resistor R7 plays a limited role. Accordingly, the emitter voltage Vb can be essentially the same as the voltage Vt of the saw-tooth signal ST. Therefore, the offset voltage Voff is the voltage in the node (c) as given in Equation 5.

$$Voff = \left(\frac{R9}{R8+R9}\right)Vt + \left(\frac{R8}{R8+R9}\right)Vsense \quad \text{[Equation 5]}$$

In FIG. 6, the dotted line shows the sensed voltage Vsense in the graph showing the offset voltage Voff. In the interval t12, before the switching MOS transistor M is turned on, the sensed voltage Vsense is zero and the offset voltage Voff has a waveform that is similar to the emitter voltage Vb. After the switching MOS transistor M is turned on, a non-zero sensed voltage Vsense is generated. The voltage difference between the sensed voltage Vsense and the emitter voltage Vb is scaled by the resistance ratio of the resistors R8 and R9. The offset voltage Voff is substantially the same as the voltage that is reduced by the voltage of the resistor R8 from the emitter voltage Vb. Moreover, it also corresponds to the voltage that is increased by adding the voltage of the resistor R9 to the sensed voltage Vsense. The waveform of the offset voltage Voff is similar to a waveform obtained by adding the waveform of the sensed voltage Vsense to the waveform of the emitter voltage Vb. In FIG. 6, at time Tc, the sensed voltage Vsense is essentially the same as the reference voltage Vref. Since, the offset voltage Voff develops to a higher level quicker than the sensed voltage Vsense, the offset voltage Voff can become equal to the reference voltage Vref at the start of the interval toff. For this reason, the switching MOS transistor M is turned off prior to the time Tc by the interval toff.

In this way, the compensation delay unit 410 can generate the offset voltage Voff using the saw-tooth signal ST and the sensed voltage Vsense. The offset voltage Voff may be inputted to the inverting input terminal (−) of the comparator 433, the reference voltage Vref may be inputted to the non-inverting input terminal (+), and the comparator 433 can output the signal corresponding to the comparison result of the offset voltage Voff and the reference voltage Vref. When the offset voltage Voff is greater than the reference voltage Vfb, the comparator 433 may output a low signal, and when the offset voltage Voff is smaller than the reference voltage Vfb, the comparator 433 may output a high signal.

The first NOR gate 434 can perform a logical NOR operation of the signal outputted from the LEB unit 440 and the signal outputted from the comparator 433. The signal outputted from the LEB unit 440 and the signal outputted from the comparator 433 can be inputted to the first NOR gate 434, and the first NOR gate 434 outputs the signal according to the result of the logical NOR operation. With the logical NOR operation, when the input signals are low, an output signal from the first NOR gate 434 is high. When at least one of the input signals is high, the output signal is low.

A PWM flip-flop 432 can output a signal according to the result of the logic operation using two input signals to the inverted output terminal/Q. Two input signals are the clock signal CLK and the signal outputted from the first NOR gate 434. The clock signal CLK can be input to the set terminal S, and the signal outputted from the first NOR gate 434 can be input to the reset terminal R. The PWM flip-flop 432 can operate similarly with a normal SR flip-flop as shown in Table 1.

TABLE 1

| INPUT SIGNAL | | CURRENT STATE | NEXT STATE | |
| --- | --- | --- | --- | --- |
| S | R | Q(t) | Q(t + 1) | /Q(t + 1) |
| 0 | 0 | 0 | 0 | 1 |
| 0 | 0 | 1 | 1 | 0 |
| 0 | 1 | 0 | 0 | 1 |
| 0 | 1 | 1 | 0 | 1 |
| 1 | 0 | 0 | 1 | 0 |
| 1 | 0 | 1 | 1 | 0 |
| 1 | 1 | 0 | DISABLED STATE | |
| 1 | 1 | 1 | | |

In Table 1, the next state of the PWM flip-flop 432 can be determined according to the signal inputted to the set terminal S, the signal inputted to the reset terminal R, and the current state Q(t). The PWM flip-flop 432 can output the signal corresponding to the logical value of the /Q(t+1) through the inverted output terminal /Q.

The second NOR gate 435 can perform a logical NOR operation of the signal outputted from the PWM flip-flop 432 and the clock signal CLK. The second NOR gate 435 can generate a gate driver control signal Vdriv according to the result of the logical NOR operation. The gate driver control signal Vdriv is applied to the gate driver 460.

The gate driver 460 can turn on the switching MOS transistor M when the gate driver control signal Vdriv is high, and it turns off the switching MOS transistor M when the gate driver control signal Vdriv is low.

Figure 7:
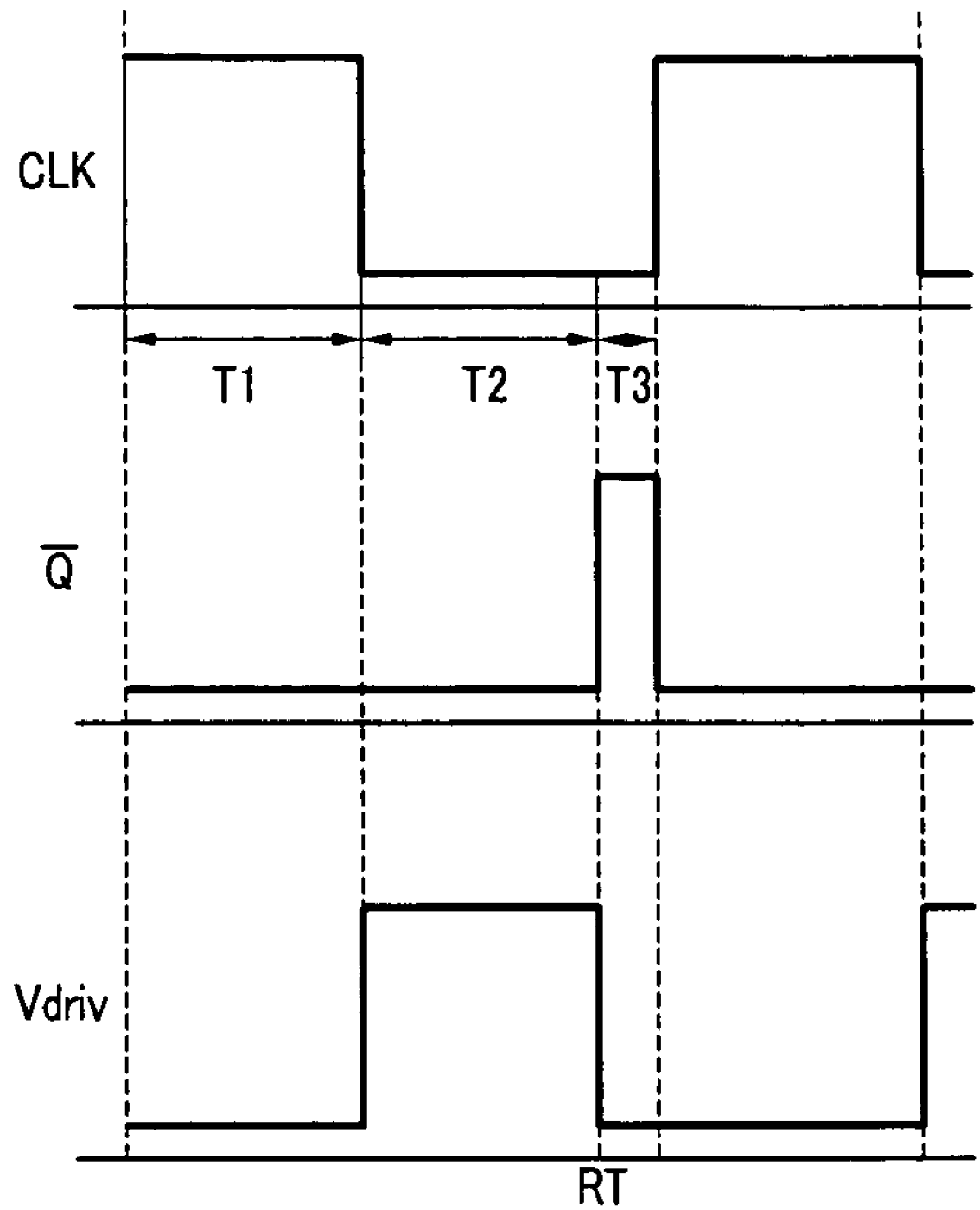
FIG. 7 illustrates a waveform diagram of a voltage signal in the SMPS.

FIG. 7 illustrates a waveform of the gate drive control signal Vdriv, the clock signal CLK, and the signal outputted from the PWM flip-flop 432.

In the interval T1, the high clock signal CLK can be inputted to the SET terminal S. Therefore, the signal outputted from the PWM flip-flop 432 may be low regardless of the signal level inputted to the reset terminal R. The high clock signal CLK and the low signal outputted from the PWM flip-flop 432 can be inputted to the second NOR gate 435. This can make the gate drive control signal Vdriv low, thus the gate driver 460 keeps the switching MOS transistor M in the turned-off state.

In the interval T2, the low clock signal CLK can be inputted to the set terminal S. In the interval T2, the reference voltage Vref can be higher than the offset voltage Voff, so the signal outputted from the comparator 433 is high. The high signal outputted from the comparator 433 and the low signal outputted from the LEB unit 440 are inputted to the first NOR gate 434. The first NOR gate 434 can output the low signal to the reset terminal R of the SR flip-flop 432. So, the inverted output signal /Q is low in the interval T2. Subsequently, the NOR gate 435 can receive the low signals and it can produce a high gate driver control signal Vdriv. The gate driver 460 can turn on the switching MOS transistor M corresponding to the inputted high gate driver control signal Vdriv.

At the time RT, the offset voltage Voff can be higher than the reference voltage Vref, so the signal outputted from the comparator 433 can be low. The low signal outputted from the comparator 433 and the low signal outputted from the LEB unit 440 can be inputted to the first NOR gate 434. The first NOR gate 434 can output the high level signal to the reset terminal R of the SR flip-flop 432, thus changing the inverted output signal /Q of the SR flip-flop 432. The inverted output signal /Q can be maintained high in the interval T3, and the second NOR gate 435 can produce a low gate driver control signal Vdriv. The gate driver 460 turns off the switching MOS transistor M corresponding to the inputted low gate driver control signal Vdriv.

In the described manner, the output signal of the comparator 433 is adjusted according to the offset voltage Voff and the reference voltage Vref, corresponding to the feedback voltage. As the gate driver 460 is controlled according to the level of the output signal of the comparator 433, the on/off of the switching MOS transistor M can be controlled.

Figure 8:
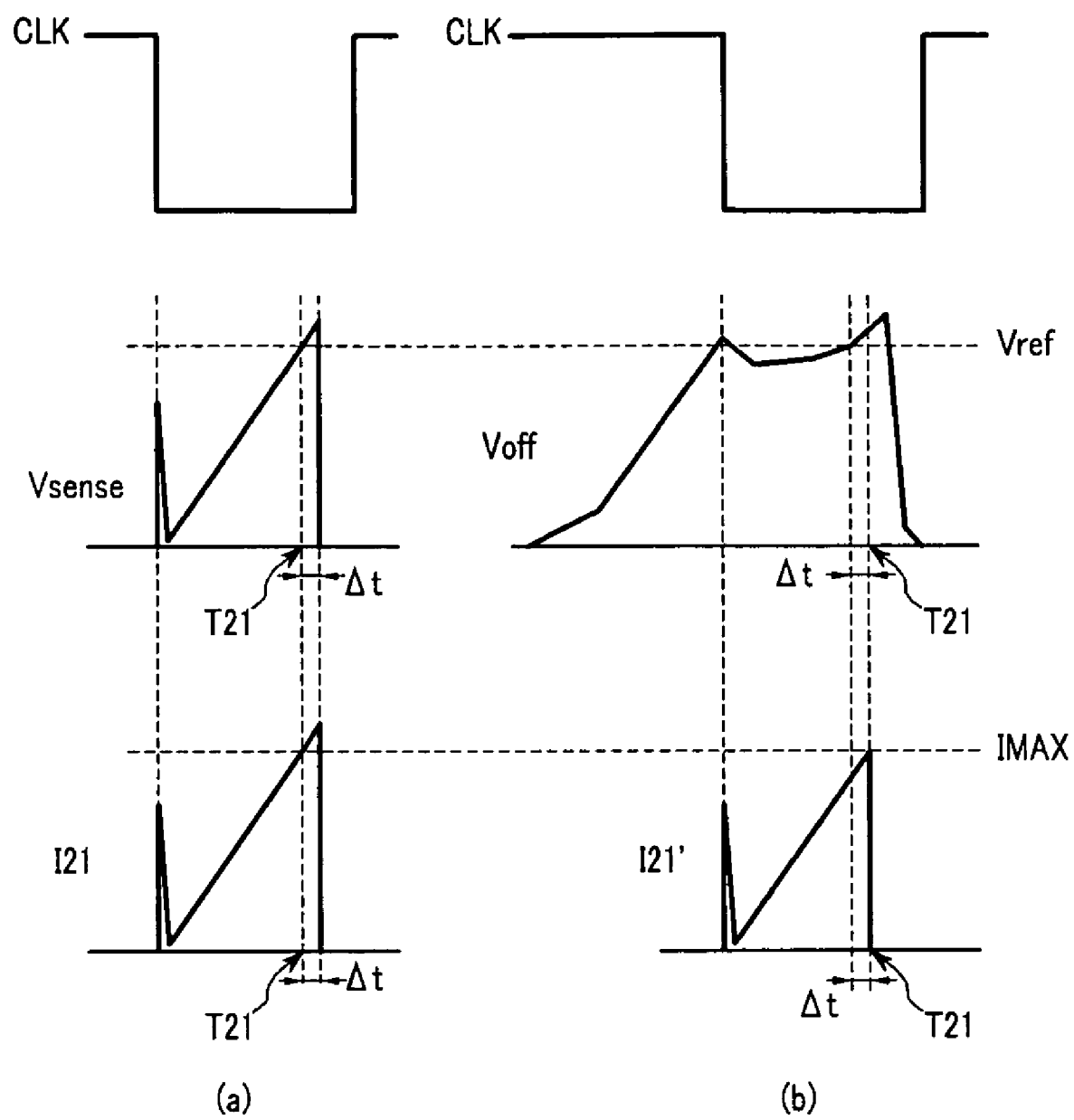
FIG. 8 illustrates a waveform diagram of an offset voltage, a clock signal, and a current in a main switch in the SMPS.
Figure 9:
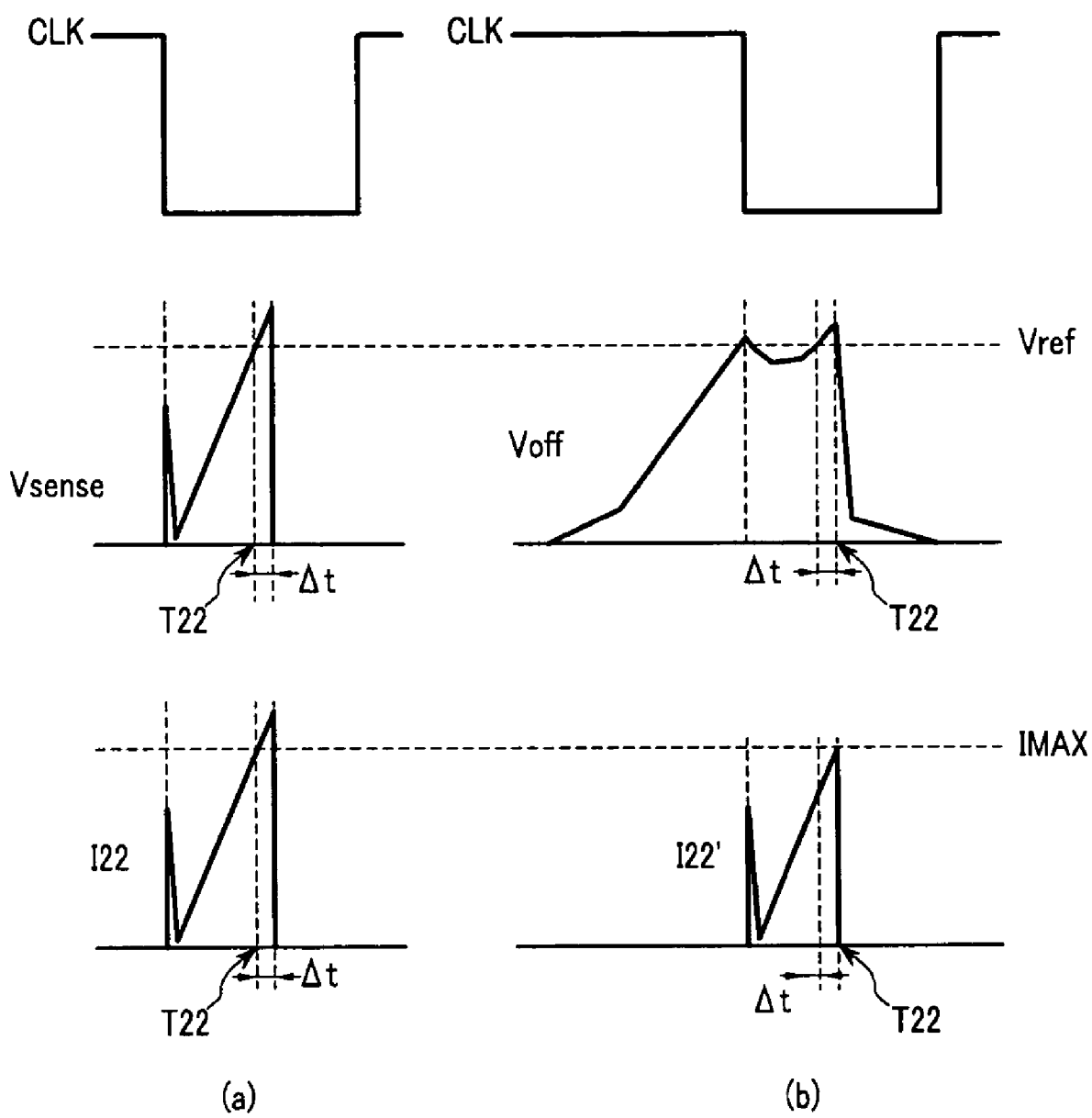
FIG. 9 illustrates a waveform diagram of an offset voltage, a clock signal, and a current in a main switch in the SMPS when an input voltage level is higher than that of FIG. 8.

FIGS. 8 and 9 illustrate that the maximum value of the current in the switching MOS transistor M is maintained essentially constant when the input voltage varies in the SMPS.

FIG. 8 illustrates the case when the input voltage is a first input voltage V21, represented by the waveform corresponding to the current I21' flowing in the switching MOS transistor M of the SMPS including the compensation delay unit 410. The current I21 flowing in the switching MOS transistor M of the conventional SMPS does not include the compensation delay.

FIG. 8(*a*) illustrates that when the clock signal CLK is falling, the switching MOS transistor M may be turned on. The drain current I21 of the switching MOS transistor M begins to flow and the sensed voltage Vsense is generated with the resistor Rsense while the drain current I21 keeps flowing.

The sensed voltage Vsense and reference voltage Vref can be the same by the time T21, but the turn-off is delayed by the propagation delay time Δt.

The drain current I21 then rises to a higher level than that of the maximum current IMAX.

FIG. 8(*b*) illustrates the case of controlling the turn-off of the switching MOS transistor M by using an offset voltage Voff and the reference voltage Vref.

The offset voltage Voff and the reference voltage Vref become the same a delay time Δt earlier than the time T21.

Therefore, the switching MOS transistor M is turned off at the time T21, delayed by the delay time Δt. The drain current I21' then increases to the same level as the maximum current IMAX, and does not continue to flow after the time T21.

FIG. 9 illustrates a waveform of the current I22' flowing in the switching MOS transistor M of the SMPS including the compensation delay 410, when the input voltage V22 is higher than the input voltage V21 in FIG. 8. The current 122 flowing in the switching MOS transistor M of the conventional SMPS does not include the compensation delay. In FIG. 9, the reference voltage Vref and the maximum current IMAX have essentially the same value as the reference voltage Vref and maximum current IMAX in FIG. 8.

In FIG. 9(*a*) the turn-off of the switching MOS transistor M is determined by using the reference voltage Vref corresponding to the feedback voltage Vfb and the sensed voltage Vsense. In FIG. 9(*b*) the turn-off of the switching MOS transistor M is determined by using the offset voltage Voff and reference voltage Vref. With increasing input voltage the duty decreases and the slope of the drain current I22 waveform increases. The offset voltage Voff and the reference voltage Vref become essentially the same a delay time Δt earlier than time T22. Therefore, the switching MOS transistor M is turned off at time T22, delayed by the delay time Δt. The drain current I22' then increases to essentially the same level as the maximum current IMAX, and no longer flows after time T22.

In this way, even if the input voltage varies, the maximum value of the current flowing in the drain of the switching MOS transistor M remains essentially constant. Therefore, the maximum output power can be maintained essentially independent of the level of the input voltage.

Figure 10:
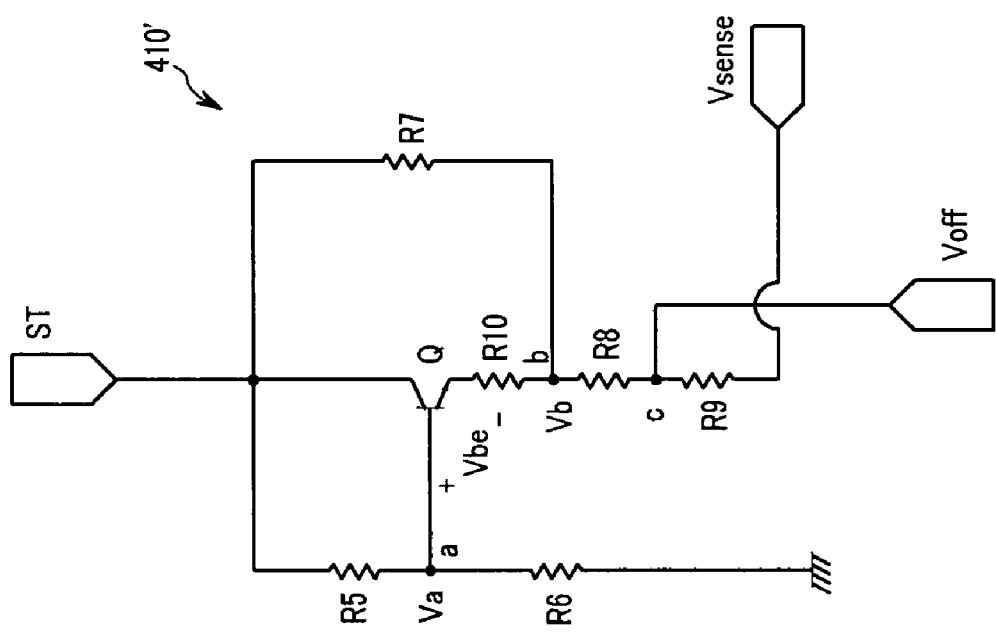
FIG. 10 is a circuit diagram of a propagation delay compensator of the SMPS.

FIG. 10 illustrates a circuit diagram showing another embodiment of the compensation delay unit 410'.

In FIG. 10 the compensation delay unit 410' can further comprise a resistor R10 in addition to the earlier embodiments. The resistor R10 is coupled between the emitter of the switching element Q and the resistor R8.

The resistor R10 can modify or compensate the temperature dependence of the characteristics of the switching element Q. For example, if the temperature of the SMPS rises, the threshold voltage Vbe of the switching element Q may be reduced. When the voltage Va is lower than a certain value, the switching element Q can be turned on.

The first transition point (P 1 of FIG. 6) of the slope of the voltage Vb is then advanced, and the second transition point (P 2 of 6) of the slope of the voltage Vb is retarded. Therefore, the waveform of the voltage Vb changes with the temperature. Correspondingly, the level of the reference voltage can become greater than the offset voltage Voff at a time that is less desirable such that the maximum value of the drain current of the transistor M cannot be maintained.

Therefore, in order to increase the emitter voltage of the switching element Q as the threshold voltage is reduced, the resistor R10 can be coupled in series to the emitter of the switching element Q. The resistance of R10 can have a positive temperature coefficient (PTC), meaning that the resistance increases proportionally to the rise of the temperature. The PTC of the resistor R10 can be selected to compensate for the decrease of the threshold voltage Vbe of the switching element Q with the rise of the temperature.

In this way, the compensation delay unit 410 that has a compensating resistor R10, can provide a drain current of the switching MOS transistor M having an essentially fixed maximum value, even though the temperature incrementally rises with the current flowing in the drain of the switching MOS transistor M.

In sum, the switching mode power supply can supply an essentially fixed maximum output power independent of the input voltage. The switching mode power supply can also compensate for a voltage drop generated by a temperature increase, and supply an essentially fixed maximum output power.

While this invention has been described in the context of certain specific embodiments, it is to be understood that the invention is not limited by the disclosed embodiments, but, to the contrary, is intended to cover various modifications and equivalent arrangements included within the spirit and scope of the appended claims.

What is claimed is:

1. A switching mode power supply (SMPS) comprising:
   a power supply including a main switch coupled to a primary coil of a transformer, and supplying power to a secondary coil of the transformer according to an operation of the main switch;
   a feedback circuit for generating a feedback voltage corresponding to an output voltage of the secondary coil; and
   a switching controller essentially compensating a propagation delay including a comparator,
      the comparator being coupled to a feedback voltage terminal to receive a reference voltage corresponding to a feedback voltage, and to a sense voltage terminal via a propagation delay compensator to receive a first signal, related to a first voltage corresponding to a current flowing through the main switch, and
      the comparator being configured to compare the reference voltage to the first signal and to control a duty of the main switch according to the result of the comparison.

2. The SMPS of claim 1, wherein the main switch is turned off with a time compensation corresponding to the propagation delay, according to the result of comparing the first signal with the reference voltage.

3. The SMPS of claim 2, wherein the switching controller generates the first signal using the first voltage and a second signal corresponding to a saw-tooth signal.

4. The SMPS of claim 3, wherein the first voltage is generated from the current flowing through the main switch in an ON state, to a resistor that is serially coupled between the main switch and ground.

5. The SMPS of claim 4, wherein the switching controller comprises
   a transistor turned on corresponding to the saw-tooth signal; and the switching controller is configured to generate the first signal using the saw-tooth signal delivered through the ON main switch and the first voltage.

6. The SMPS of claim 5, wherein the main switch is turned on at a falling-edge of a clock signal and turned off when the first signal is greater than the reference voltage.

7. The SMPS of claim 6, wherein a first period when the saw-tooth signal is falling to the low level from the high level comprises a second period and a third period, and a first slope of the second signal corresponding to the second period is different from a second slope of the second signal corresponding to the third period.

8. The SMPS of claim 7, wherein the first slope is greater than the second slope.

9. The SMPS of claim 7, wherein the period of the clock is essentially the same as that of the saw-tooth signal.

10. A switching controller for controlling a duty of a main switch of a switching mode power supply (SMPS) including the main switch coupled to a primary coil of a transformer, comprising;
    a gate driver, an output terminal of which is connected to a control electrode of the main switch;
    a first logic operation unit, operable to perform a logical NOR operation and having an output terminal coupled to an input terminal of the gate driver, and an input terminal configured to receive a first clock signal;
    a second logic operation unit, having an output terminal coupled to an input terminal of the first logic operation unit, and an input terminal configured to receive a first signal;
    a third logic operation unit, having an output terminal coupled to an input terminal of the second logic operation unit;
    a comparator, having an output terminal coupled to an input terminal of the third logic operation unit, and configured to receive a first voltage through a non-inverting terminal; and
    a compensating delay unit, configured to generate a second signal using a third signal and a second voltage corresponding to a current flowing through the main switch and to deliver the second signal to an inverting terminal of the comparator.

11. The SMPS of claim 10, wherein the compensation delay unit comprises:
    a first resistor, having a first terminal to receive the second voltage, and a second terminal coupled to the non-inverting terminal;
    a second resistor, having a first terminal coupled to the second terminal of the first resistor;
    a third resistor, having a first terminal coupled to the second terminal of the second resistor; and
    a switching element, having a first electrode coupled to the second terminal of the third resistor; and a second electrode coupled the second terminal of the second resistor, wherein the switching element is configured to operate in correspondence with the third signal.

12. The SMPS of claim 11, wherein the compensation delay unit comprises:
    a fourth resistor, having a first terminal coupled to the first electrode of the switching element, the third signal being delivered to the first terminal, and a second terminal coupled to a control electrode of the switching element; and
    a fifth resistor, having a first terminal coupled to a control electrode of the switching element.

13. The SMPS of claim 12, wherein a waveform of the third signal is a saw-tooth waveform.

14. The SMPS of claim 13, wherein the switching element is an n-type channel transistor.

15. The SMPS of claim 14, wherein the compensation delay unit comprises:
    a sixth resistor, having a first terminal coupled to the second electrode of the switching element, and a second terminal coupled to the second terminal of the second resistor.

16. The SMPS of claim 15, wherein the sixth resistor has a resistance temperature coefficient value for compensating for a temperature dependence of a threshold voltage of the n-type channel transistor.

17. The SMPS of claim 16, wherein the first voltage corresponds to a feedback voltage that corresponds to an output voltage generated at an output stage of the transformer.

18. The SMPS of claim 17, wherein the third logic operation unit is a NOR gate, having an input terminal coupled to a leading edge blanking circuit.

19. The SMPS of claim 18, wherein:

the second logic operation unit is an SR flip-flop;

the first signal is a clock signal applied to a set terminal of the SR flip-flop; and a reset terminal of the SR flip-flop is coupled to the output terminal of the third logic operation unit.

20. The SMPS of claim 19, wherein the first logic operation is a NOR gate, having an input terminal coupled to an inverting output terminal of the SR flip-flop.

21. The SMPS of claim 1, wherein the propagation delay compensator comprises:

a first resistor, having a first terminal to receive the second voltage, and a second terminal coupled to the non-inverting terminal;

a second resistor, having a first terminal coupled to the second terminal of the first resistor;

a third resistor, having a first terminal coupled to the second terminal of the second resistor; and a switching element, having a first electrode coupled to the second terminal of the third resistor; and a second electrode coupled the second terminal of the second resistor, wherein the switching element is configured to operate in correspondence with the third signal.

22. The SMPS of claim 21, wherein the propagation delay compensator comprises:

a fourth resistor, having a first terminal coupled to the first electrode of the switching element, the third signal being delivered to the first terminal, and a second terminal coupled to a control electrode of the switching element; and a fifth resistor, having a first terminal coupled to a control electrode of the switching element.

\* \* \* \* \*